United States Patent
Sohn

[15] 3,645,190
[45] Feb. 29, 1972

[54] PHOTOGRAPHIC SHUTTER WITH AN ELECTRONIC TIMING DEVICE

[72] Inventor: Jorg Alfred Sohn, Wildbad, Germany

[73] Assignee: Prontor-Werk Alfred Gauthier G.m.b.H, Calmbach, Black Forest, Germany

[22] Filed: Dec. 10, 1969

[21] Appl. No.: 883,961

[30] Foreign Application Priority Data

Dec. 12, 1968 Germany..................P 18 14 120.3

[52] U.S. Cl. ..........................................................95/53 R
[51] Int. Cl. ......................................................G03b 9/62
[58] Field of Search ..............................95/53, 53.3, 58, 63

[56] References Cited

UNITED STATES PATENTS 3,437,026  4/1969  Espig........................................95/53
3,476,031  11/1969  Starp........................................95/63

Primary Examiner—Samuel S. Matthews
Assistant Examiner—Monroe H. Hayes
Attorney—March, Le Fever & Wyatt

[57] ABSTRACT

The photographic shutter has a reciprocating driving member for moving the shutter blades into open and closed positions. An electronic timing device controls a spring-biased two armed lever, one of the lever arms locks the driving member in the open position of the shutter blades and is advantageously designed to be bendable or collapsible. The bendable lever arm is located in the path of motion of a projection on the driving member so that the projection strikes against the end face of the lever arm before the reversal movement. The pin located on the shutter blade driving member is engageable with this lever arm to return the arm from a collapsing or bent position into an extended position at the end of the shutter closing action.

3 Claims, 4 Drawing Figures

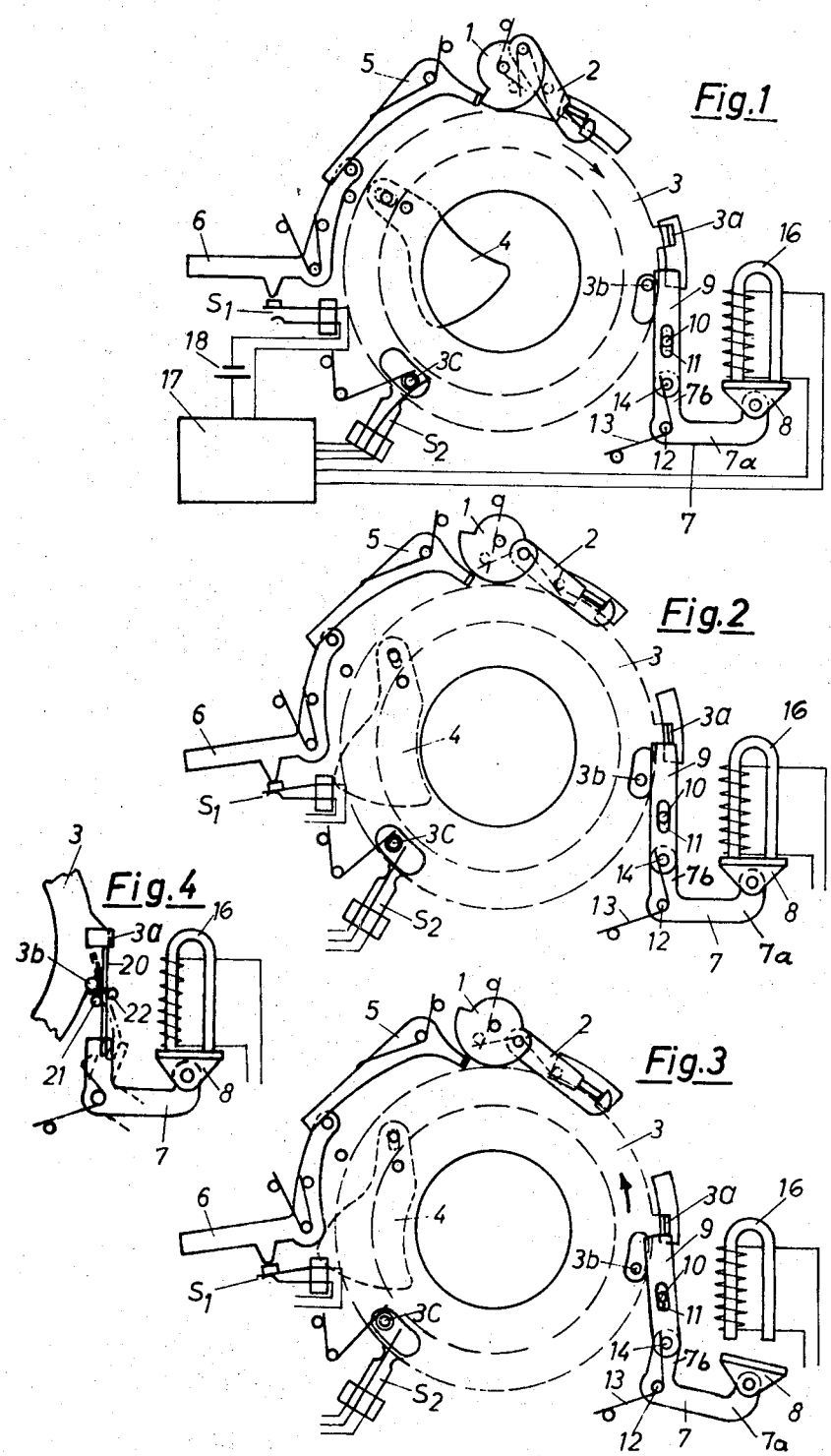

PHOTOGRAPHIC SHUTTER WITH AN ELECTRONIC TIMING DEVICE

The invention relates to a photographic shutter having a reciprocating driving member which moves the shutter blades into the opened and closed positions and an electronic timing device which controls a two-armed armature lever biased by a spring, one lever arm locking the shutter blades in the open position for the duration of an exposure time.

A photographic shutter of this kind is known in which an electromagnetically actuatable open-time stop is used and which is provided with a stop lever which moves into the path of a projection at the instant of movement reversal of the shutter blade ring, and is moved out of the locking position by an armature lever after a certain time interval. A disadvantage of this locking mechanism is that a certain time is required for engaging and disengaging the stop lever on and from the shutter blade ring, so that this arrangement does not allow extremely short exposure times to be obtained. Moreover, during the disengagement of the locking lever by the armature lever, frictional forces have to be overcome which necessitate a spring of corresponding strength to act on the armature lever.

An electromagnetic open-time lock is also known, including an armature lever for a two-blade shutter, one blade striking against the armature lever before the movement reversal thus preventing the shutter ring from passing the reversal point until the electromagnet of the electronic timing device releases the armature. This arrangement avoids the additional engaging and disengaging time, but the armature lever, after the armature has been released, has to be displaced against the action of a spring by the shutter blade. This arrangement requires a rather large electromagnet, since as the effective line of attracting force of the magnet armature does not pass through the pivot, the magnet has to exert a considerable force. Finally, the use of a magnetic lock has been proposed in an electronic shutter with a pawl-driven blade ring in which the effective line of the thrust applied to the armature lever, passes through its pivot. Since the electromagnetically actuatable armature lever projects in the locking position into the movement path of a lug provided on the driving disc of the shutter, the locking time of this open-time lock is very small, but herein, besides a certain amount of time required for disengaging, an increased force to overcome the frictional resistance during the disengaging of the lever are required.

In the present invention the arm of the armature lever cooperating with the driving member is a toggle or spring and is so arranged with regard to the direction of movement of the driving member that a lug provided thereon strikes against the end face of the arm before the reversal of movement, a pin located on the shutter blade driving member returning the lever arm from the collapsed position into the extended position at the end of the shutter closing action. This formation of the open-time lock combines all the advantages of known embodiments but avoids their disadvantages. On the one hand the arrangement is such that the effective line of the thrust force occurring during locking passes through the pivot of the armature lever, so that no torques are exerted on the armature lever, the advantage of this being that the electromagnet, the armature and the whole lever mechanism may be formed of components which may be relatively small. On the other hand, only small forces are required to cause the lever arm of the armature lever acting as lock to collapse, the collapsing spring in its action being assisted by the pressure from the shutter blade ring. Moreover, the said stop mechanism requires nothing more than the use of a pin on the driving member to cause the lever arm to resume its extended position from its collapsed position.

According to a feature of the invention, the lever arm of the armature lever associated with the shutter blade driving member is formed as a toggle which has a pin and slot guide, whilst the spring acting on the armature lever engages on the toggle joint. Instead of a toggle joint, the arm of the armature lever associated with the shutter blade driving member may be provided with a flat spring which is longitudinally guided between two locating pins.

The invention will be described in detail below by way of an embodiment and shown in the accompanying drawings in which:

FIG. 1 shows the shutter blade driving mechanism of a photographic shutter with electronic timing control including an electromagnetic open time stop, the shutter drive being in the cocked position, FIG. 2 is the shutter arrangement after actuation of the release with the shutter blade ring locked, the ring being prevented by an arm of the armature lever from passing through its reversal point, FIG. 3 is the shutter blade ring after release by the armature lever, FIG. 4 is an alternative embodiment of the armature lever.

The drawings show the shutter blade driving mechanism of a photographic shutter fitted with electronic timing control. A spring actuated driving disc 1 has a driving pawl 2 hingedly connected thereto which in turn engages with a shutter blade ring 3 to act as a driving mechanism. The ring 3 in turn acts in known manner on the shutter blades 4, of which only one is shown. In the cocked position shown in FIG. 1 the shutter blade driving mechanism is locked by means of a spring biased stop lever 5. The latter is adapted to be moved out of the stop position by means of a further spring-biased release lever 6. On actuation of the release mechanism 5, 6, the shutter blade ring 3 is driven by the pawl drive 1, 2 as indicated by the arrow in FIG. 1, a lug 3a provided on the periphery of the shutter blade ring 3 striking against the end face of an armature lever 7 located in the movement path thereof just before reversal of movement of the ring. This lever as shown in FIGS. 1 to 3 is formed as a pivoted two-armed lever, one arm 7a of which carries an armature 8 and the other arm 7b thereof together with a further hingedly connected supporting lever 9 forms a bellcrank lever. The lever 9 is guided by means of a pin and slot guide device 10, 11. The two-armed armature lever 7 is mounted on a fixed pin 12 and is so arranged with regard to the reciprocating shutter blade ring 3 that the effective line of the thrust force occurring thereon always passes through the aforesaid pin. The latter carries a coil spring 13 which at one end is fixedly supported and at the other end engages on a pin 14 hingedly connecting the arm 7b with the supporting lever 9, the spring acting on the part of the armature lever 7 formed as a bellcrank lever to disengage the armature 8 from the magnet. This disengagement is prevented by a pin 3b located on the shutter blade ring 3 against which pin the lever 9 is supported and which, by resisting the spring pressure, holds the bellcrank lever in the extended position in the starting position of the driving ring 3.

An electromagnet 16 which is connected in the circuit with an electronic timing device 17 shown schematically in the drawing, actuates the armature 8. A switch $S_1$ located in the movement range of the release lever 6 is provided to initiate the action of the timing device, which includes RC networks and a transistor relaxation circuit, the device acting to connect the electromagnet 16 to the battery 18 just before the shutter drive is released. A further switch $S_2$ is also located in the circuit of the electronic timing device 17; this switch cooperates with a contact pin 3c located on the shutter blade ring 3 and has two contact positions. It initiates the beginning of the timing action when the blades 4 have uncovered the lens aperture. In addition, when the blades return to their original closed position, the switch $S_2$ applies a short circuit to a capacitor of the timing control circuit.

The shutter arrangement described above operates as follows:

When the release mechanism 5, 6 commences to actuate, the switch $S_1$ is closed, resulting in a build up of a magnetic field in the electromagnet 16 holding the armature 8. This magnetic field counteracts the action of spring 13 on the link pin 14 and retains the armature lever 7 in the position shown in FIG. 1, the bellcrank lever 7b, 9 cooperating with the shutter blade ring 3 to form a rigid system. Final movement of the release lever 6 releases the driving mechanism 1, 2 which moves the shutter blade ring 3 in the blade opening direction as indicated by the arrow in FIG. 1. The lug 3a located on the shutter blade ring 3 strikes against the end face of the supporting strap 9 before reaching the ring reversal point and the switch $S_2$ starts the timing action of the electronic circuit 17. When the latter becomes conductive after a predetermined interval of time, the magnetic field of the electromagnet 16 collapses, releasing the armature 8. The spring 13 engaging the link pin 14 now causes disengagement of the armature 8 from the electromagnet 16 and moves the lever 7 about the pin 12 anticlockwise. This movement results in a tough deflection of the compound arm 7b, 9 of the armature lever associated with the shutter blade ring 3. The supporting strap 9 of the armature lever 7 locking the shutter blade ring 3 moves back and allows the shutter blade ring 3 to reverse its movement, whereupon the ring, as indicated by arrows in FIG. 3, closes the shutter blades. In the end phase of this movement the pin 3b mounted on the shutter blade ring 3 strikes against the supporting strap 9, acts thereon and transfers the armature lever 7 into the position shown in FIG. 1 whilst overcoming the force of spring 13. On reaching this position, the armature 8 again rests against the electromagnet 16. The pin 3b retains the armature lever 7 in this position until the shutter blade ring 3, after the driving mechanism 1, 2 has been cocked, is moved again into the open blade position.

In accordance with the arrangement shown in FIG. 4, the arm of the armature lever 7 cooperating with the shutter blade ring 3 is formed of a flat spring 20 guided by two pins 21 and 22 located fixedly on both sides thereof. The operation is the same as that of the armature lever shown in FIGS. 1 to 3, with the exception that the elasticity of the flat spring 20 replaces the bellcrank/toggle lever effect.

Having thus described my invention, I claim:

1. A photographic shutter including a reciprocating driving member moving the shutter blades into the opened and closed positions, an electronic timing device controlling a spring-biased two-armed armature lever, one of said lever arms locking said driving member in the open position of said shutter blades, said one of said lever arms cooperating with said driving member being bendable or collapsibly formed and located in the path of movement of a projection on said driving member so that said projection strikes against the end face thereof before the reversal movement, and a pin located on said shutter blade driving member and engageable with said one of said lever arms to return said lever arm from a collapsed or bent position into an extended position at the end of the shutter closing action.

2. The photographic shutter according to claim 1 wherein said one of said lever associated with the shutter blade driving member is formed as an elbow lever and is retained by means of a pin and slot guide, while the spring acting on the armature lever is connected at the joint of said elbow lever.

3. The photographic shutter according to claim 1 wherein said one of said lever arms associated with said shutter blade driving member has a flat leaf-type spring rigidly connected therewith, said leaf spring being guided longitudinally between two fixed points.

* * * * *